United States Patent [19]

Kotrappa

[11] Patent Number: 5,055,674

[45] Date of Patent: Oct. 8, 1991

[54] ELECTRET IONIZATION CHAMBER FOR MONITORING RADIUM AND DISSOLVED RADON IN WATER

[75] Inventor: Payasada Kotrappa, Frederick, Md.

[73] Assignee: Rad Elec, Inc., Frederick, Md.

[21] Appl. No.: 386,778

[22] Filed: Jul. 31, 1989

Related U.S. Application Data

[63] Continuation-in-part of Ser. No. 936,240, Dec. 1, 1986, Pat. No. 4,853,536.

[51] Int. Cl.⁵ .............................................. G01T 1/185
[52] U.S. Cl. ..................................... 250/255; 250/253; 250/336.1; 250/374; 250/380
[58] Field of Search ................. 250/336.1, 374, 432 R, 250/253, 255, 380

[56] References Cited

U.S. PATENT DOCUMENTS 4,227,086 10/1980 Dreyfus et al. ...................... 250/389

FOREIGN PATENT DOCUMENTS

866314 3/1971 Canada .................................. 250/364

Primary Examiner—Carolyn E. Fields
Attorney, Agent, or Firm—Cushman, Darby & Cushman

[57] ABSTRACT

An electret ion chamber based radon monitor is employed as a method of measuring radium-226 and dissolved radon-222 concentrations in water. The procedure consists of taking a known volume of water and placing it in a container of known volume and determining the equilibrium radon concentration in the air phase above the water using an electret ion chamber radon. The radon concentration in the original water sample is calculated from the radon concentration of the air phase. A detailed theory is proposed and experimental results reported. Given a 200 ml water sample, it is typically possible to measure radon concentration of 160 pCi/l with an accuracy of 10% in a one day measurement. One pCi/l of Ra-226 can be also determined with an accuracy of 10% over a 10 day period.

24 Claims, 7 Drawing Sheets

ELECTRET IONIZATION CHAMBER FOR MONITORING RADIUM AND DISSOLVED RADON IN WATER

BACKGROUND OF THE INVENTION

This is a continuation-in-part of application Ser. No. 06/936,240 filed Dec. 1, 1986, now U.S. Pat. No. 4,853,536.

This present invention provides simple, effective and accurate measurement of radon in water. Additionally, the present invention can be used to monitor radium (Ra-226) in water.

Measurements of radioactive gas are important for many purposes. Tritium concentrations in potentially exposed workers are measured, for example, with periodic urine specimens. Carbon-14 serves as a useful research tool or monitoring the progress of many chemical and biological reactions and interactions. For example, many microorganisms break down carbon-14 containing compounds in sugar to produce carbon-14 dioxide gas which can be collected and measured to determine various characteristics of the microorganisms. Both tritium and carbon-14 dioxide produce low energy radiation which cannot be easily measured by conventional radioactivity detectors.

Radon (Rn-222) and thoron (Rn-220) are radioactive gases which are formed in the uranium and thorium decay series. They decay by alpha emissions with a half-life of 3.8 days and 55.4 seconds respectively. When they are formed near the surface of uranium containing materials such as soil or rock, they can diffuse out into the surrounding air where they and their daughter products can pose a radiological hazard to man under certain conditions. Each time a radon (Rn-222) atom decays, its daughter products, polonium-218 (Po-218), lead-214 (Pb-214), bismuth-214 (Bi-214), polonium-214 (Po-214), decay in sequence with half lives of 3.05 minutes, 26.8 minutes, 19.7 minutes, 0.16 milliseconds, respectively. The Po-218 and Po-214 are more hazardous than their radon gas parent because they emit very energetic alpha particles and they are particulates and can deposit in lungs when breathed. Once in the lungs, their high energy alpha emissions can damage tissue and may cause cancer. Thoron which decays in a similar manner, is harmful to a lesser degree.

Radon and associated daughter products have long been known to be a causative agent for lung cancer when present in high concentrations usually found in uranium mines. More recently, concern has been expressed by many scientists over the high radon concentrations that have been measured in poorly ventilated homes all across the country. Hazardous radon concentrations often build up in homes, especially in "tightly" constructed energy-efficient homes and in those which have been retrofit sealed to conserve energy. The U.S. Environmental Protection Agency has estimated that 5,000–20,000 lung cancer deaths will occur annually in the United States as a consequence of this radon buildup in homes. The resulting concern over this hazard has given rise to a need for a low cost, passive instrument for measuring the concentrations of these natural radioactive gases. Similar health hazards are associated with breathing other radioactive gases such as tritium or carbon-14 dioxide in and around nuclear facilities.

Integrating-type monitors which measure the average concentrations of radon or other radioactive gases over a few days, weeks or months are especially useful because wide short-term fluctuations in concentration often occur due to perturbations in ventilation and atmospheric conditions. The present invention meets all of these needs. When used as a radon and/or thoron monitor, it is simple, small and rugged enough to be mailed to homeowners and back to the laboratory for readout. This eliminates the cost of technicians traveling to and from the homes to perform the monitoring. A miniature version can be worn to monitor workers for radon, thoron or tritium exposure. In another embodiment, it serves to monitor the very small quantities of tritium and carbon-14 dioxide emitted from biologically active cultures in certain measurements and experiments.

Several scientists have described various types of passive environmental radon monitors (PERMS) in recent years. However, only a few of them, e.g., A.C. George (Ref 1: A Passive Environmental Radon Monitor; Radon Workshop—Feb. 1977, HASL-325; 1977 p. 25) and C. Costa-Riberio, et al. (Ref. 2: A Radon Detector Suitable for Personnel or Area Monitoring, Health Physics Vol, 17, 1969), utilized a thin metal plate maintained at a high negative voltage to collect the positively charged decay products of radon to gain increased measurement efficiency and accuracy. This enhanced accuracy is especially needed for the home monitoring application where radon concentrations are normally low. All of these workers took advantage of the fact that the radon daughter products are positively charged when formed. The alpha radiation emitted by the daughter products is measured either by thermoluminescent dosimeters or by alpha track detectors and the results are used to calculate the radon concentration.

The collection plates and the measuring detectors in these earlier devices were located inside filtered passive diffusion chambers which prevented the radon daughter products already present in outside air from reaching the detector. Only the parent radon gas can pass through the filter by passive diffusion to enter the measuring chamber. In these earlier devices, the radon gas which diffused into the chamber was indirectly monitored by measuring the radiation from the daughter products which are formed inside the chamber after they were collected on the surface of the collectors. They did not measure the parent radon gas directly. Radioactive gases such as C-14 dioxide and tritium do not form charged particulate daughter products. Therefore, the earlier inventions cited will not measure these gases. The present invention, however, will measure any radioactive gas because their radioactive emissions always generate ions in the chamber air. Further, the present invention uses an electret as a sensor which is different from the detectors used by earlier devices.

Kotrappa et al. (Ref. 3: Electret - A New Tool for Measuring Concentrations of Radon and Thoron in Air) also experimented with electrets for indirect monitoring of radon or thoron. They used negatively charged electret as a collector in the place of metal sheet maintained at a high negative voltage. They also measured alpha radiation of collected daughter products by scintillation detectors or by other known detectors.

In addition, they made an incidental measurement of charge on the polycarbonate sheet covered electret as a requirement of the experiments to ensure sufficient charge on the polycarbonate sheet to collect the daughter products. The difference in surface charge of the polycarbonate sheet before and after the experiment was not used for measurement of radon. However, they found a rather poor correlation between the difference in charge on the polycarbonate sheet (electret itself was not measured) to the cumulative radon exposure and suggested further work.

There are two reasons why that earlier device gave a very poor correlation with radon exposure as follows: (1) The polycarbonate foil used by Kotrappa, et al. had a much higher electrical conductivity than the electret material which was fluorocarbon polymer. This conductivity caused the ions which collected on the polycarbonate foil to bleed off to ground much more readily than they do from the electret. (2) The adhesive tape and the air gap between the polycarbonate foil and the electret caused by the adhesive tape in the Kotrappa device also perturbed the ion collection and retention capability of the electret assembly substantially.

All of these factors contributed to the very poor correlation between radon exposure and surface voltage in the Kotrappa device and rendered it unsuitable for radon monitoring.

In another paper, Kotrappa et al. (Reference 4: Measurement of Potential Alpha Energy Concentration of Radon and Thoron Daughters Using an Electret Dosimeter, Rad. Prot. Dos. Vol. 5, No. 1 of p.49–56-1983) measured the voltage difference on an electret to quantify the amount of alpha energy expended in air by radon and thoron daughter products which were captured on a filter. The system did not measure radon gas. The device developed by Kotrappa et al. in Ref. 4 also embodies a pump to transport the radon daughter products into the chamber.

A need exists for small compact rugged devices which are capable of accurately and dependably measuring radiological gases and integrating the measurements over known times.

H.B. Marvin (Reference 5: U.S. Pat. #2,695,363; Method and Apparatus for Measuring Ionizing Radiations, issued Nov. 23, 1954) used an electret to collect and store ions. The chamber in this earlier invention was sealed to prevent air entry so it measured only the gamma radiation which penetrated through the chamber wall.

Figure 1:
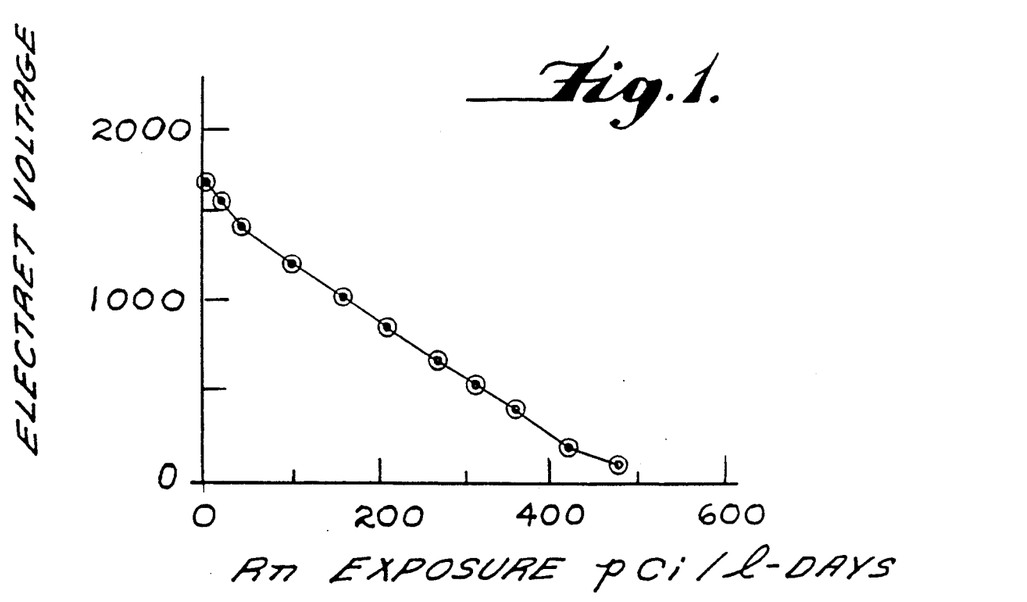
FIG. 1 is a plot of a calibration curve showing the response of the preferred environment of the invention to various amounts of radon.

This correlation between electret voltage and radon exposure using the present invention (i.e., with no adhesive tape or polycarbonate film), is excellent and it serves as a very accurate radon monitor. FIG. 1 shows this correlation using the present invention with a 225 ml cup-shaped chamber and 2.3 mm thick electret made of FEP Teflon.

The present invention also differs from devices which used real-time detectors (i.e., devices connected to real-time electronic readout systems). The present invention uses, instead, an electret type detector which records and integrates the positive or negative ions generated by the radon and radon daughter radiations without the need for connections to electronic devices during the radon exposure period. Real-time electronic equipment is too expensive and unwieldy for large scale home monitoring use.

Some monitoring devices are too large and heavy for home use because of the high voltage batteries or power supply utilized to maintain the charge on the detectors. Instead of batteries, the present invention uses a small precharged electret as described above. The electret ion-collection approach enables an accurate monitoring device which is small and rugged enough to be sent to homeowners through the mail. The use of a simple electret itself as a sensor rather than a solid state detector reduces the cost of the monitor and its readout equipment substantially.

SUMMARY OF THE INVENTION

The present invention relates to a method and apparatus for monitoring radium, radon, tritium, carbon-14 dioxide or other radioactive gasses dissolved in a liquid.

The preferred embodiment includes an electret ion chamber (EIC), such as an "E-PERM" (Tm). Such an EIC includes a small enclosed volume with an electrostatically charged electret attached to the inner chamber wall. Ions resulting from the decay of radioactive gas inside the chamber are attracted to the electret. These ions collect on the electret surface and reduce the electret voltage. The amount of voltage reduction can be related to the amount of radioactive gas within the chamber.

In the present invention, a liquid sample is placed in a radioactive-gas-tight container so as to partially fill the container. The dissolved gas is allowed to diffuse into the unfilled portion of the container and achieve an equilibrium concentration.

An EIC is connected to the container so that the EIC measures the amount of radioactive gas which has diffused into the unfilled portion of the container. The amount of radioactive gas measured by the EIC can be related to the amount of radioactive gas dissolved in the liquid at the time of sampling.

The preferred embodiment can accept liquid samples with volumes in the range of 40–200 ml, and parameters can be selected to allow encasement of concentrations of as low as 100 pCi/l or as high as 10,000 pCi/l with an accuracy of 10%.

DETAILED DESCRIPTION OF THE PREFERRED EMBODIMENT

The present invention measures and integrates measurement of radium and radioactive gases dissolved in water with compact rugged portable devices. The devices are suitable for use with measurement of any radioactive gas, for example, radon, tritium and carbon-14 dioxide and dissolved radium. For convenience of understanding and compactness of disclosure, the devices will be described in use with measuring radon in water.

The present invention makes use of the passive diffusion chamber principle, but it does not depend on collection of the daughter products, nor does it utilize other radiation detectors.

The present invention uses a charged electret surface to collect ions formed by the ionizing radiations (primarily alpha radiation) emitted by both the radon and radon daughters anywhere in the chamber. This collection and measurement of ions rather than daughter product atoms eliminates the cause of a substantial error found in the earlier radon monitors; viz., false low radon concentration readings in measurements taken in high relative humidity conditions. The present invention exhibits no such error since ion mobility is not affected by humidity.

The humidity error in the earlier daughter product collection instruments was though to be due to water molecules which, due to their polar properties, gather on some of the charged daughter product atoms soon after their formation. This added weight slowed down the rate of travel of the affected daughter product atoms giving them more time to be electrically neutralized by nearby negative ions. This neutralization stopped their collection, causing them to decay in the chamber air rather than on the solid state detector surface. This caused the earlier monitors having solid state radiation detectors to give radon concentration values substantially below the actual value on humid days.

The present invention depends on the movement of ions rather than daughter products to the collecting surface. Such ions are smaller than the daughter product atoms, and their mobility is known to be unaffected by moisture.

Unlike the charged daughter product atoms, the smaller ions move quickly and efficiently to the electret from any point in the chamber even under high humidity, to yield a true radon in water concentration values.

This collection of ions rather than daughter products also gives the newly invented monitor more sensitivity for monitoring radon or thereon. This higher sensitivity is needed to measure the low radon concentration found in many homes and for low levels of radon in water. The added sensitivity in the present invention for radon measurement comes from the fact that it measures ionization from the parent radon-222 decay events which occur in the chamber, in addition to the daughter product decay radiations. The earlier solid state detection devices only measured the later (daughter product) events whereas the electret in the present invention collects ions formed by the parent radon-222 alpha particles as well as those formed by the two radon daughter products. Thus, on-third more decay events are measured by the present invention from the same radon concentrations. The previous monitor only collected and measured the daughter products, not the radon itself because radon atoms are not electrosatically charged, and therefore are not attracted to he charged detectors used in those devices. Any ions which were attracted to the charged detector in those earlier devices were not measured because the solid state radiation detectors used were not capable of measuring ions as does the electret in the present invention.

The preferred embodiment of the present invention teaches exposing and reading the voltage of the electret itself with no foil attached to it. The preferred embodiment of the present invention does not embody a polycarbonate foil on or above the electret. Instead, the electrostatic field emanating from the electret surface is measured directly.

This correlation between electret voltage and radon exposure using the present invention (i.e., with no adhesive tape or polycarbonate film), is excellent and it serves as a very accurate radon monitor. FIG. 1 shows this correlation using the present invention with a 225 ml cup-shaped chamber and 2.3 mm thick electret made of FEP Teflon.

The present invention also differs from devices which used real-time detectors (i.e., devices connected to real-time electronic readout systems). The present invention uses, instead, an electret type detector which records and integrates the positive or negative ions generated by the radon and radon daughter radiations without the need for connections to electronic devices during the radon exposure period. Real-time electronic equipment is too expensive and unwieldy for large scale home monitoring use.

Some monitoring devices are too large and heavy for home use because of the high voltage batteries or power supply utilized to maintain the charge on the detectors. The present invention does not use any battery or high voltage source but uses a small precharged electret as described above. The electret ion-collection approach enables an accurate monitoring device which is small and rugged enough to be sent to homeowners through the mail. The use of a simple electret as a sensor rather than a solid state detector reduces the cost of the monitor and its readout equipment substantially.

The present invention measures radon gas concentration dissolved in water, not radon daughter products because it embodies a filter which precludes daughter products from entering the measuring chamber. The present invention utilizes passive diffusion to transport the radon into the chamber.

The charged electrets used to collect and measure radon generated ionization in the invention can be of either positive or negative polarity. Depending on the polarity of the electret used, it functions in the invention in one of the following ways:

(1) Using a positively charged electret: When a positively charged electret is used as in the preferred embodiment of the invention, only the negative ions generated by the alpha emissions in the chamber collection on the surface of the electret. Here, the surface of the electret repels both the positive ions and the radon daughter products (which are all positively charged) causing them to move to and attach to the chamber wall where their electrostatic charge immediately discharges to the ground. The daughter products eventually decay on the chamber wall with 50% of them emitting their radiations (primarily alpha particles) back into the chamber air to ionize the air therein. The negative ions accumulate on the positive electret, causing its surface voltage to decrease. A measure of this electret voltage reduction again serves as the basis for calculating the desired radon concentration value, as described above.

(2) Using a negatively charged electret: When a negatively charged collector-electret is used, the positive ions which are formed by the radiations from the decay of radon and radon daughter product atoms move quickly to the negative electret by virtue of the electrostatic potential field established in the chamber. In this embodiment, the negative air ions which are generated in the chamber air move to the chamber wall where they are discharged to ground.

As the positive ions build up on the negative electret, they cause the electret surface voltage to decrease. A measurement of the difference in the electret surface voltage before and after the radon exposure can then be used to determine the desired radon concentration value using a predetermined calibration table. In this embodiment, the positively charged daughter products are also attracted to the electret. This phenomena is of little practical consequence when smaller chambers (i.e., up to about 1 liter) are used because the majority of the ions formed by their decay radiations get collected and measured regardless of where the radon decay events take place in the chamber. However, this daughter product collection increases the sensitivity of monitors having chamber volumes larger than one liter.

When larger chambers are used to gain more sensitivity, all or part of the inner chamber surfaces may also be lined with electret material charged in a polarity opposite to that of the electret to aid in moving the ions toward the electret before they recombine, i.e., to repel the ions toward the electret to hasten their capture on its surface. This same electret lining of the chamber can also be used in the invention with an uncharged piece of electret material (fluorocarbon polymer) in place of the electret. In this embodiment, the uncharged polymer piece serves to collect and retain the ions which are repelled by the charged chamber surfaces because it is at a much lower voltage and, in effect, behaves as if it were charged in the opposite polarity. The charge from the radon emissions builds up with increased radon exposure in this embodiment.

The volume of the chamber can also be varied to increase or decrease the sensitivity and dynamic range of the invention for radon measurement within limits. The radon sensitivity of the invention is directly proportional to the chamber volume over a large volume range. Chambers up to 5 liters in volume can be used for high sensitivity and down to 0.005 liters for low sensitivity within this proportional range. The sensitivity falls rapidly in chambers less than about 0.05 liters because more of the alpha particle energy is expended in the chamber walls rather than in ionizing air in the chamber. Accordingly, chambers of less than 0.05 liters are preferred in monitors which require low sensitivity, e.g., those exposed to high radon concentrations for long durations.

The electrets used in the present invention are, in the preferred embodiment, made of fluorocarbon polymer or some other suitable polymer having a high electrical resistivity which prevents the accumulated charge from "leaking" to ground. FEP or PTFE Teflon of 1 to 200 mil thickness are preferred materials for the purpose.

Within limits (up to about 500 mils), the thicker the electret, the larger its surface voltage becomes for equivalent electrostatic charge and the larger its voltage drop will be for equivalent radon exposure. Thus, the electret thickness is varied in practice to obtain an optimum voltage change depending on the number of ions expected to accumulate on the electret in a given radon monitoring situation.

Two electrets of different polarity (i.e., one positive and one negative) and different thickness can also be embodied in the same chamber to extend the dynamic range of the monitor. For example, a thick positive electret will give maximum voltage change for low radon concentrations and a thin, negative electret in the same chamber will record high concentrations beyond the range of the thick electret. Since one of the electrets in this embodiment collects only negative ions and the other collects only positive ions, they both function in the same chamber.

Figure 3:
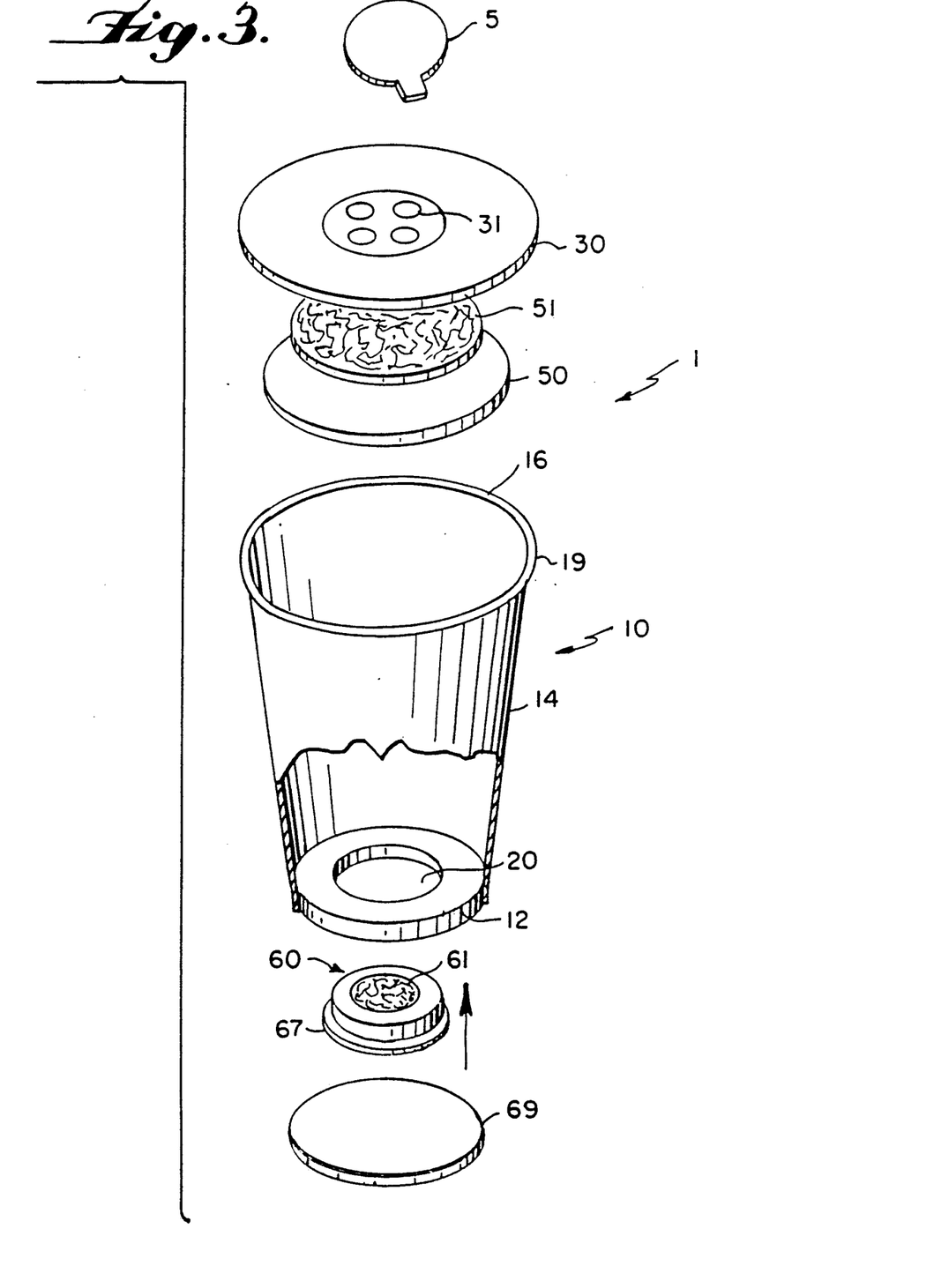
FIG. 3 is a sectional elevation of the preferred embodiment of an ionization chamber for monitoring radon constructed according to the present invention.
Figure 3A:
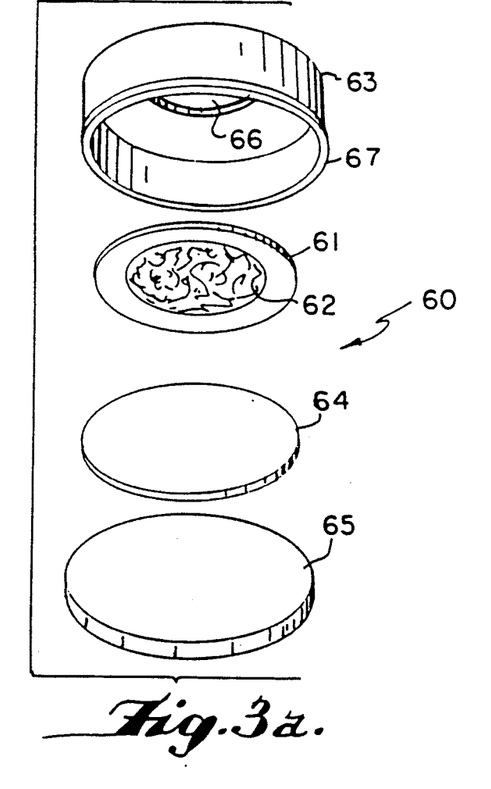
FIG. 3a is an exploded sectional elevation of the electret assembly in the preferred embodiment.
Figure 3B:
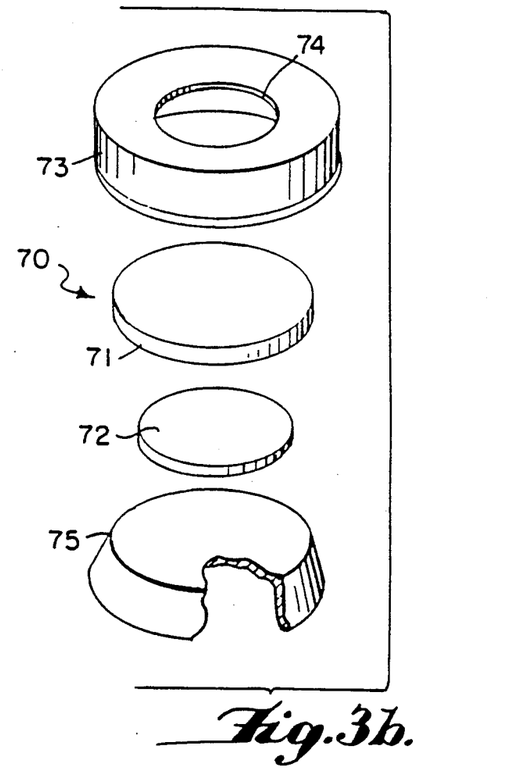
FIG. 3b is an exploded sectional elevation of an alternative capped electret assembly embodiment which can be substituted for the electret assembly shown in FIG. 3.

In another embodiment of the invention, an uncharged detector (electrically neutral) detector cap made of high dielectric electret material (usually fluorocarbon polymer) is fixed in a rigid holder above the electret, as shown in FIG. 3b. The detector cap may be in direct contact with the electret or be held a short distance directly below it. In this embodiment, the detector cap is transparent to the electrostatic field emanating from the electret under it so the ions generated by radon decay in the chamber collect on the cap surface rather than on the electret itself. In this embodiment, the cap is removed from the electret and the increase in its surface voltage is measured (rather than the decrease in electret voltage) to determine the radon concentration value. The configuration shown in FIG. 3b permits the cap to be removed from the electret for measurement without altering the charge on it (the cap).

Figure 2:
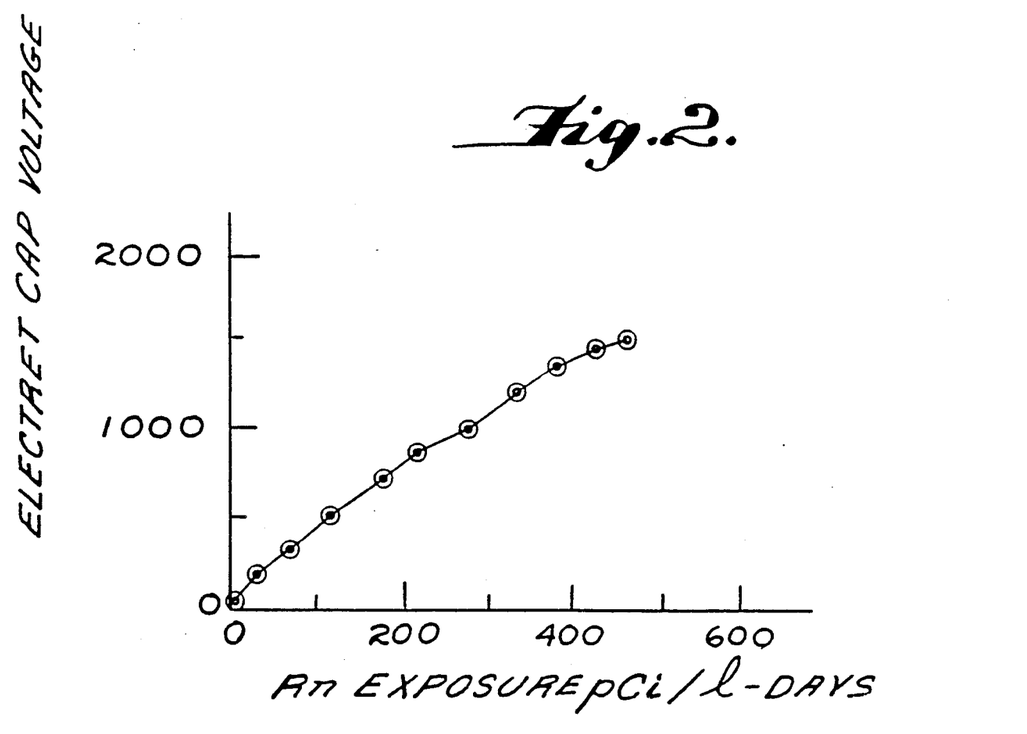
FIG. 2 is a plot of a calibration curve showing the response of the alternative embodiment of the invention to various amounts of radon.

This electret detector cap is usually the same size and shape as the electret, i.e., if the electret is a 3 cm. diameter disc, the cap is also a 3 cm. disc. Being made of the same material as the electret, this cap is initially transparent to the electric field from the electret under it. This is true regardless of the polarity of the electret charge. As mentioned above, the cap intercepts and collects the ions drawn toward the electret by virtue of its (the electret's) electrostatic field. These intercepted ions accumulate on the cap surface and are held there firmly by the electrostatic field of opposite polarity emanating from the permanently charged electret underlying it. The accumulated charge on the cap can be measured at any time by removing it (the cap) from the electret and measuring its (the cap's) surface voltage. The surface cap voltage of the detector cap increases with increased radon exposure as shown by the calibration curve shown in FIG. 2.

This capped electret assembly can be substituted directly for the uncapped one (as used in the preferred embodiment) in the ionization chamber of the present invention for monitoring radon.

This capped electret embodiment has advantages over the preferred embodiment for some applications. Most important, the charge on the electret is not diminished by use so it never has to be recharged. Its radon measuring accuracy is not affected by voltage instabilities in the underlying electret because the voltage of the cap, not that of the electret, is measured to determine the radon concentration. Also since the cap always has zero charge prior to radon exposure, there is no need to measure and record the surface voltage before use of the invention, i.e., a single voltage measurement after the radon exposure is al that is needed to make the radon concentration calculation.

Since the ions collect on the detector cap rather than on the electret itself in this capped electret embodiment, the surface voltage of the electret remains essentially constant throughout the exposure and measurement process. This results in a substantial cost advantage for the capped embodiment because there is not need to recharge the electret after each monitoring use. Instead, it is only necessary to place a new uncharged cap on the same electret to proceed with the next radon measurement. The caps can be discharged in various ways and re-used many times.

Kotrappa, et al. (see discussion of Reference 3 above) placed a cap on their electret in a manner similar to that taught in this embodiment, however, as pointed out in the above discussion on this reference, they used a cap made of polycarbonate rather than fluorocarbon polymer and they did not measure the surface voltage of the separated cap for monitoring the radioactive gas as taught here.

The preferred embodiment of the invention is a small (40-500 ml) chamber into which radon or other radioactive gas can readily enter by diffusion through a hole covered with a filter membrane material. The membrane material and thickness is chosen so as to delay the transport of any thoron which may be present so it all decays away before it gets into the chamber. Thoron has a half life of only 55.6 sec. so this is readily accomplished by a latex rubber membrane 50 um thick. The average amount of thoron present can be monitored by subtracting the readings of two like devices which have been exposed for the same time period, one with and one without a thoron excluding membrane.

A positively charged electret is fixed to the inside surface of the chamber which electrostatically collects the negative ions (electrons) which are generated in the chamber by the decaying radon and radon daughter products. Each negative ion neutralizes a positive ion in the electret causing the surface voltage of the electret to drop. The invention has a simple adhesive tape sealing mechanism for opening and closing it to radon entry from the surrounding environment and a lid which can be opened to permit removal of the ion chamber for measurement or replacement.

After the initial electret voltage is measured and the monitor is located in or on the home facility or person to be measured, the user removes the tape seal over the filtered hole in the chamber for a known, predetermined time so that the radioactive gas in the environment can enter. When the exposure time is over, the homeowner reseals the chamber hole with the mechanism provided and returns the whole device to the laboratory where the final electret voltage is measured. A commercial surface voltage measuring instrument is available which can measure these electret voltages to within 1 volt without disturbing the remaining charge on the electret. Thus, the electret can usually be remeasured or reused repeatedly without recharging. From the difference in the electret voltage readings before and after the radon exposure, the average concentration of radon which existed in the surrounding environment during the test period is calculated using a calibration curve.

The basic components of the preferred embodiment of the ionization chamber for monitoring radioactive gases shown in FIG. 3 are the cup-shaped chamber 10, a porous, removable cover assembly 30 and a removable electret assembly 60 fixed to the bottom surface 12 of the chamber 10. The monitor includes a removable adhesive tape seal 5 which adheres to the top of the cover 30 to seal the monitor against radon entry before and after its exposure to the environment to be measured. Cup 10 has a circular disk-shaped bottom 12. A truncated cone-shaped side wall 14 extends upward from the periphery of the disk-shaped bottom 12 and terminates upwardly in a large, open, upper edge 16.

A rounded ledge 19 around the inner perimeter of the cup 14 slightly below the upper edge 16 serves as a seat and a seal for the cover 30. A friction fit or an appropriate adhesive or an adhesive tape around the edge 16 serves to hold the cover 30 on the ledge 19 when the monitor 1 is assembled.

The cover 30 contains a hole or group of holes 31 near its center to permit gases to enter. A filter 50 and a membrane 51 are fixed over the holes 31 on the bottom of the cover 30 with an appropriate adhesive bond. Filter 50 removes particles, ions and radon daughter products from the ambient gas that passes in and out of the chamber 10 through the holes 31 in the cover 30. The membrane 51 serves to exclude thoron gas from entering by delaying its diffusion until it all decays (it's half life is only 55.6 sec.).

Holes 31 through the cover 30 permit radon to diffuse through the filter 50 and into the chamber 10 continuously while excluding all outside dust, ions and charged radon daughter atoms.

The charged electret 61 attracts and captures any ions of opposite polarity formed in the chamber 10 by the nuclear emissions of the decaying radon and radon daughter products. The chamber 10 can be made of any rigid material which is impermeable to radon, such as metal or plastic, but its inner surface must be electrically conductive to conduct away to ground any electrostatic charged caused by ions which attach to it during monitoring. The cover 30 can be made of any rigid material such as plastic or metal, but its inner surface must also be electrically conductive.

An electret assembly 60 is fixed in the center of the inside surface of the chamber bottom 12.

The top portion of the cylindrical electret assembly 60 fits tightly into hole 20 through the bottom 1 of chamber 10 but the bottom ring 67 will not pass through the hole 20 because it is larger in diameter than the hole 20. Accordingly, it seals against the chamber bottom 12. The electret assembly 60 is held in place by a cardboard disk 69 which is forced into the bottom of the chamber 10 so as to hold the assembly ring 67 firmly against the chamber bottom 12. The cardboard disk 69 can be removed to remove the assembly 60. FIG. 3a is a sectional elevation of this electret assembly. The bottom of the electret 61 is covered with an electrically conductive metallic backing 62. This backing 62 is electrically connected to the surface of the electret protector cup 63 by a metal foil 64 held in place by the friction fitted retainer disk 65, which is usually made of cardboard.

The electret protector cup 63 has a hole 66 in its top which exposes the electret 61 and permits its electrostatic field to emanate into the chamber 10. The electret assembly 60 can be removed from the chamber 10 for measurement by mechanically breaking the adhesive bond between the retainer disk 65 and the chamber bottom 12.

The preferred shape of the electret 61, which is permanently electrostatically charged, is a disk, as shown.

FIG. 3b is a sectional elevation of an alternative electret and cap assemblies 70 which embodies a cap 71 held above or in contact with the electret 72 by cap holder 73. The cap 71 is suspended across the hole 74 in the cap holder 73 by adhesive bonding attachment to the cap holder 73. The cap 71 is made of a fluorocarbon polymer having a high electrical resistivity so the ions which accumulate on its surface do not bleed off to ground. The electret 72 is bonded to the bottom of the electret holder 75 which fits inside of the cap holder 73 to bring the electret 72 into contact with the cap 71. The electret 72 and cap 71 can be held in contact by bonding applied between the electret holder 75 and the cap holder 73.

Figure 4:
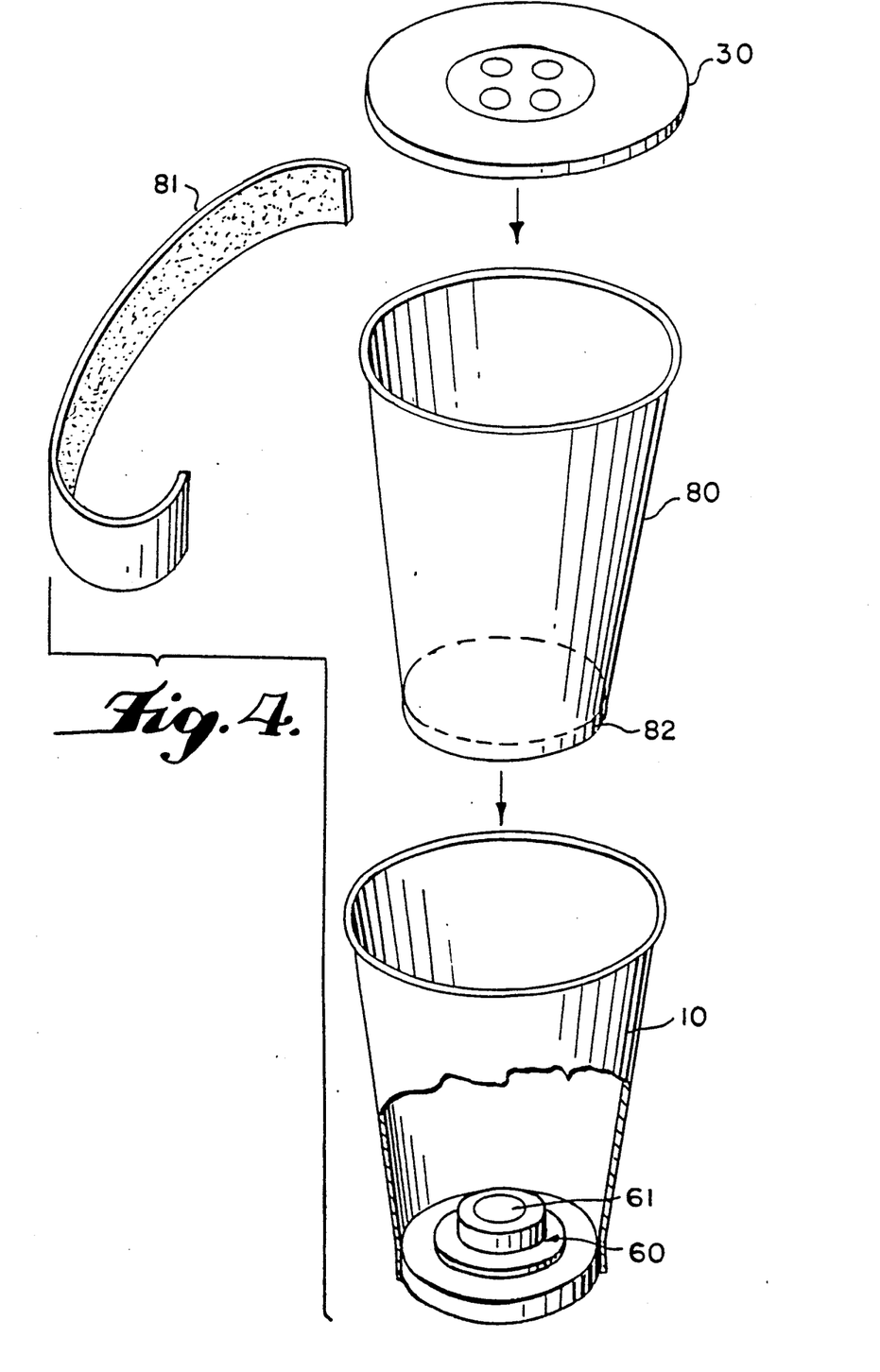
FIG. 4 is a sectional elevation of an alternate embodiment of an ionization chamber for monitoring radon constructed according to the present invention which has features which reduce the contribution of background gamma radiation to the radon signal.

FIG. 4 shows an optional cup-in-cup embodiment which can be used with either embodiment of the invention to improve their radon measuring accuracy. This inner chamber or cup 80 is of the same shape as the chamber 10 in the preferred embodiment shown in FIG. 3 and it fits inside of the chamber 10 in FIGS. 3 and 4. Either embodiment of the invention will function without this inner cup 80 but it serves to improve the accuracy of the radon measurement. Prior to storage and shipment, the inner cup 80 is slipped inside the radon monitoring chamber 10. The tight fitting cover 30 containing the filter 30 is then placed on the inner cup 80 and adhesive tape 81 is applied between the two components to hold them together and to prevent radon entry into the volume remaining in the false bottom 82 during storage and shipment. The entire inner surface of the false volume 82 is lined with a conductive material to prevent the electrostatic field from the electret 61 from entering inner cup 80.

It can be seen that the inner cup 80 purges the air and radon from the ionization chamber 10 as it is shoved into place inside the chamber 10. The inner cup 80 has a false bottom 82 which straddles the electret assembly 60 or 70 with-out touching it when the inner cup 80 is in place inside the chamber 10. With the radon and air thus substantially removed from the radon chamber 10, ions are prevented from forming and collecting on the electret 61 or electret cap 71 (depending on the embodiment used). Thus the inner cup 80 effectively stops the radon monitoring process in the invention when it is in place inside the chamber 10. The same inner cup 80 eliminates all unwanted ionization generated by the background gamma radiation which penetrates the chamber 10. This improves the accuracy of the invention because background radiation is known to vary from place to place.

Figure 3C:
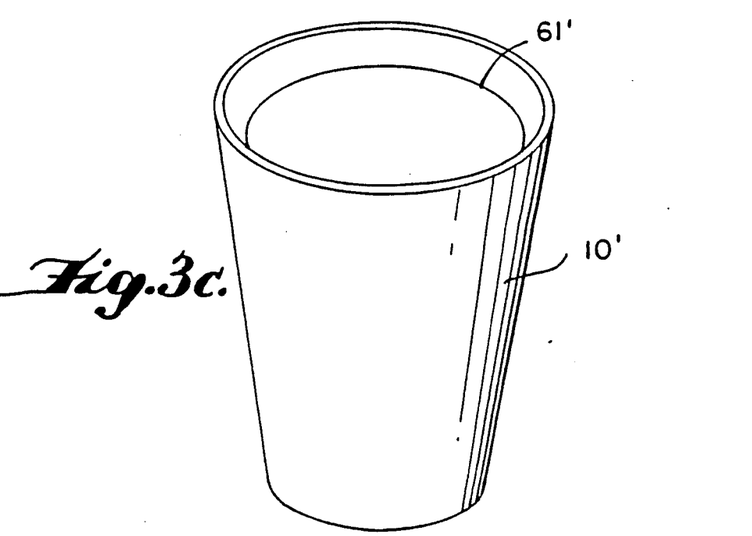
FIG. 3c is a view of an alternate embodiment showing a positively charged electrode fixed into the inside surface of the chamber.

FIG. 3c shows a positively charged electret 61' fixed to the inside surface of the chamber 10'. The positively charged electret 61' forms a second electret which lies in a spaced apart relation from the first electret 61. The second electret comprises substantially the inner surface of the chamber.

Figure 5:
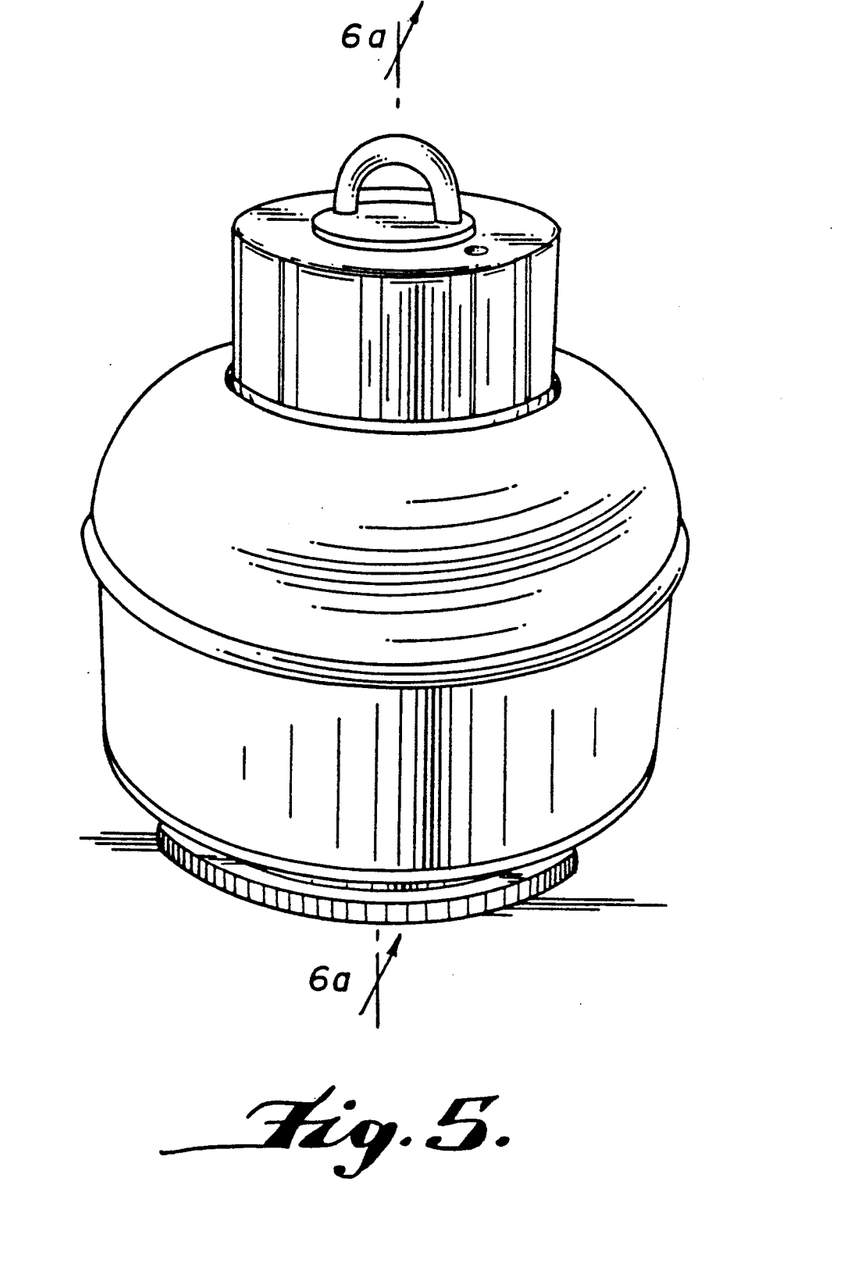
FIG. 5 is a perspective view of another preferred embodiment of an ionization chamber for monitoring radon constructed according to the present invention.

In FIG. 5 an alternative to the cup in cup is a preferred embodiment of an ionization chamber as shown in perspective view. The chamber 100 is made from a conductive plastic and has a cap 102 having a handle 104 which can be useful for hanging the container in a position to monitor radon. A hole 106 in cap 102 provides a vent for the inside of the chamber to prevent a condensation or pressure buildup within the container. An electret holder 12 is threadedly attached to the container body forming the lower portion of the container.

Figure 6A:
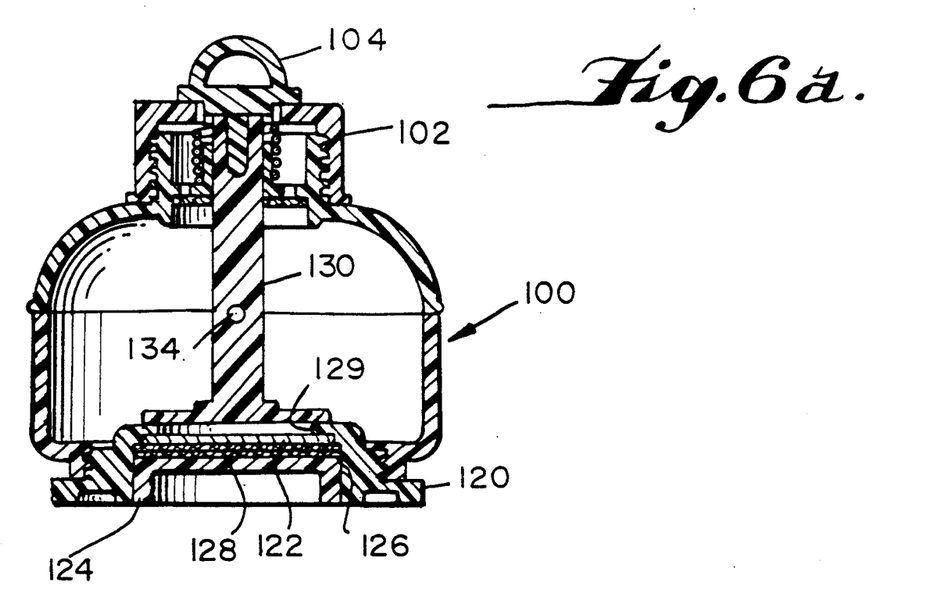
FIG. 6a and 6b are cut away views of the ion chamber of FIG. 5 in the closed and open ("on") position respectively.

FIG. 6a is a cross-sectional view of the container shown in FIG. 5. The electret holder 120 is made of conducting plastic and is threadedly screwed into the base of the container 100. An electret 122 is securely held in the electret holder 120 by plug 124. Plug 124 is held in place by friction against the electret holder 120 by use of a metal mesh 126 which backs against an aluminum foil 128 to provide electrical contact to the base of the electret. A plunger 130 is shown placed over the electret, spaced-apart by the thickness of the shouldered portion 129 of the electret holder 120. The plunger 130 acts as a keeper to minimize the air volume adjacent the electret. so that the electret is essentially shut-off as a radon monitor when the plunger is in its lowered position.

Figure 6B:
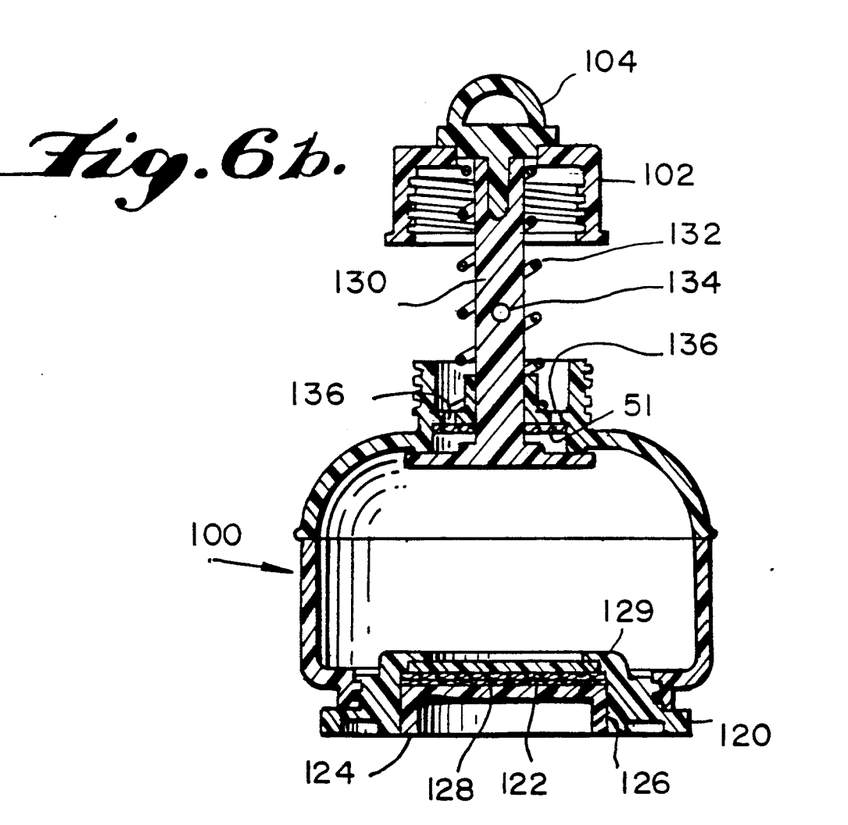

The cap 102 is screwed onto the container 100, the cap holds the plunger 130 tight against the electric holder 120 when the cap is in place. As shown in FIG. 6b, upon threadedly removing the cap, spring 132 urges the plunger 130 upward to its raised position. This removes the plunger from the electret and allows radon to enter the chamber through the openings 136 in the cap. Filter 51 is shown immediately in the throat above the ionization chamber. A hole in the stem 134 can be pinned open to prevent accidental closure of the cap, therefore assuring an accurate reading over a specific period of time and preventing erroneous false low readings.

The ionization chamber as shown in FIGS. 5 and 6 provides a radon monitor that is simple and rugged to use. It is also economical because the electret can be read and used over again until its voltage degrades below a specified level.

Overlooked in the initial concern over public exposure to airborne radon-222, there is now a growing concern over the health hazard associated with dissolved radon-222 in drinking water. The United States Environmental Pollution Agency (EPA) is expected to soon come out with a new regulation restricting the amount of dissolved radon-222 which can be allowed in public drinking water supplies. The proposed maximum allowable radon concentration is expected to be in the range of between 200 to 2,000 pCi/l. In many areas of the country, the health hazard from dissolved radon in private well water is considerably greater than for that in public water supplies. In most such wells there is little or no opportunity for the water to degas, and the short time that it takes for the water to leave the ground and be consumed means that no significant radiative decay takes place.

Several methods have been developed over the years for the detection of dissolved radon-222. One method involves the extraction of radon from a water sample using helium gas; the radon gas is then trapped onto cold charcoal. Subsequently, the charcoal is heated to drive out the gas, which is then collected into an evacuated Lucas Cell for radiation counting.

Other methods involve the collection of small volume water samples in a syringe or other appropriate sampling device. The water sample is immediately injected into a liquid scintillation vial beneath a layer of a mineral oil scintillator. The radon gas is subsequently absorbed into the scintillation fluid, where, after about two hours of equilibrium time, it is counted in a liquid scintillation counter.

A third method involves the collection of water into a standard size container, followed by gamma ray spectroscopy using a NaI(Tl) detector.

The first of these procedures involves the use of rather delicate sample collection equipment. The second and third procedures involve the use of expensive radiation counting equipment. The procedure described in this paper involves simple collection procedures and utilizes the inexpensive E-PERM (Tm) radiation monitors. E-PERM (Tm) radon monitors are based on the principle of electret ion chambers and these have been evaluated and accepted by the U.S. EPA as a method for indoor radon measurements.

In this procedure an E-PERM ion chamber in the "on" position, with a known starting voltage, is inserted into a container. A grab sample of the radon-containing water is added to the container, which is then quickly sealed. Alternatively, a sample bottle can be laid horizontally in the bottom of the container to spill its content of water. The sample bottle can be left within the container. The radon gas diffuses out of the water until equilibrium conditions are established between the air and water phases. The airborne radon gas also enters the chamber and, as it decays, discharges the electret voltage. After one to three days of exposure, the container is opened and the E-PERM is turned to the "off" position. Subsequently, the electret is removed and its voltage measured. The voltage drop between the initial and final conditions is then used to calculate the radon concentration in the air, and this is used to calculate the initial water radon concentration.

This approach will work for E-PERM (Tm) detectors, but will not work for charcoal detectors because, unlike charcoal, they are unaffected by the humid conditions which are produced in this procedure, and further, they do not absorb radon like charcoal does.

Radon gas has very low solubility in water. Its partition under equilibrium conditions between the liquid and gas phase is usually characterized by its Ostwald Coefficient (OC), which is defined as follows:

OC = (concentration of gas per unit volume in liquid phase)/(concentration of gas per unit volume in gas phase)

This coefficient is determined by measuring, at constant temperature and under equilibrium conditions, the radon concentration in both the liquid and air phases. Table 1 gives the values of this coefficient from 273.15° K. to 313.15° K. (32° F. to 104° F.).

The Ostwald Coefficient decreases when minerals, such as sodium chloride, are present in water. For example, at 293.15° K. (68° F.) the coefficient for sea water is only about 0.17, while Table 1 shows that the value for pure water is about 0.26.

TABLE 1

Ostwald Coefficient at Equilibrium Saturation Pressure for Radon and Water at Different Temperatures

| Temperature | | Ostwald |
| --- | --- | --- |
| °K. | °F. | Coefficient |
| 273.15 | 32.0 | 0.5249 |
| 278.15 | 41.0 | 0.4286 |
| 286.15 | 50.0 | 0.3565 |
| 288.15 | 59.0 | 0.3016 |
| 293.15 | 68.0 | 0.2593 |
| 298.15 | 77.0 | 0.2263 |
| 303.15 | 86.0 | 0.2003 |
| 308.15 | 95.0 | 0.1797 |
| 313.15 | 104.0 | 0.1632 |

An example of the use of this table is as follows: If in an enclosed air-water-radon system at equilibrium and at 68° F., the radon concentration in air is 100 pCi/1, then the corresponding dissolved radon concentration in water would be about 26 pCi/1. Thus, radon in water will always diffuse into the air until either equilibrium conditions are reached or the water is totally degassed. This is why surface waters generally do not present a dissolved radon-222 problem.

Let us now calculate the expected radon concentration distribution between the air and water phase in an enclosed space when a known volume of water (VW) with a known concentration of radon (RWC) is placed into the enclosure. Let VA be the volume of air remaining in the container after the addition of the water. Much of the radon gas will rapidly escape into the air phase until equilibrium conditions are reached. Let RW and RA be the equilibrium radon concentration in water and air phases respectively.

By the definition of OC, we set (1):

$$OC = RW/RA \tag{1}$$

A radioactivity balance between before and after the addition of water to the enclosed space leads to equation (2):

$$RWC \times VW = RA \times VA + RW = VW \tag{2}$$

Note: In writing equation (2) it is assumed that the amount of water that evaporates into the enclosed air is small compared to the initial volume of water. Thus, the initial and final water volumes (VW) are the same.

Combining equation 1 and 2, we obtain:

$$RWC = RA \times \left(\frac{VA}{VW}\right) + RA \times OC \tag{3}$$

Thus:

$$RWC = RA \times \left(\frac{VA}{VW} + OC\right) \tag{4}$$

When: $VA >> VW$, then: $RWC = RA \times \left(\frac{VA}{VW}\right)$

Equation (5) means that essentially all the radon has left the small water phase and is in the gas phase. Thus, by keeping the water volume small compared to the air volume, any error in the Ostwald Coefficient due to water hardness and temperature sensitivity is minimized.

Also, when:

$$VW >> VA, RWC = OC \times RA \tag{6}$$

This means that the Ostwald Coefficient is the controlling factor and should be accurately known. Thus, this condition should be avoided.

The E-PERM measurement gives only the average radon concentration (ARC) over the period of measurement, whereas what is needed is the Initial Radon Concentration (IRC) at the start of the measurement. We can now develop the relationship between the two. Because the E-PERM is being exposed for approximately one to three days, there will be some decay in the radon concentration during the exposure period. The voltage drop on the electret will be the result of the Time Integrated Concentration (TIC) of radon during the exposure period. From radiation decay considerations we can write the following equation, which puts TIC in terms of IRC.

$$(TIC) = (IRC) \int_O^T e^{-\lambda t} dt \qquad (7)$$

where:
λ=the decay constant for radon-222, 0.1813/day
T=exposure time (days)
Integrating equation (7), we obtain:

$$TIC = \frac{(IRC)(1 - e^{-\lambda T})}{\lambda} \qquad (8)$$

The Average Radon Concentration (ARC) is:

$$ARC = \frac{TIC}{T} = \frac{(IRC)(1 - e^{-\lambda T})}{\lambda T} \qquad (9)$$

Putting equation (9) in terms of the initial airborne radon concentration:

$$(IRC) = \frac{ARC \times \lambda T}{(1 - e^{-\lambda T})} \qquad (10)$$

Substituting equation (10) into equation (4), we get $$RWC = \frac{ARC \times \lambda T}{(1 - e^{-\lambda T})} \left( \frac{VA}{VW} + OC \right) \qquad (11)$$

If the sample was collected D days earlier, then the Collection Radon Water Concentration (CRWC) at the time of sampling would be:

$$CRWC = \frac{RWC}{(e^{-\lambda D})} = \frac{ARC \times \lambda T}{(e^{-\lambda D})(1 - e^{-\lambda T})} \left( \frac{VA}{VW} + OC \right) \qquad (12)$$

The right-hand side of the equation (12) contains known quantities except the Average Radon Concentration (ARC) which is measured by the E-PERM following the standard procedure. Therefore, it is possible to calculate the Collection Radon Water Concentration (CRWC).

Experimental Procedure

The following procedure was used to collect samples for both liquid scintillation and E-PERM measurements.

Water samples were collected from a home having a private well and known to have a dissolved radon concentration in the range of 2,000 pCi/l. A faucet was opened and allowed to run at near full velocity for about three minutes, thereby bringing in water from the well, not the holding tank. The water flow was reduced to a medium rate for the rest of the sampling period. A clean half-gallon sample jar was placed under the faucet and raised until the end of the tap protruded into the jar and water flowed out the top of the jar. After the careful collection of two water samples for liquid scintillation counting and with the jar still completely overflowing with water from the tap, the jar was closed with a metal lid so that there was essentially no air gap at the top of the closed jar. The lid was closed tightly and plastic caulk was molded around the lid glass interface to help reduce any radon loss during transport. The jar was transported to Penn State's Low Level Radiation Monitoring Laboratory (LLRML) where the E-PERM and additional liquid scintillation measurements were made. The voltage on four short-term electrets was measured and recorded. The electrets were placed in four E-PERM chambers, which in turn were turned on and placed inside four two liter jars. The jars were then closed with metal lids and sealed with caulk.

The lid of the half-gallon sample jar and the four E-PERM jars each contained a quarter-inch diameter hole which were normally kept sealed with a rubber stopper and sealed with caulk. The stopper and caulk on the half-gallon jar was opened, a 50 ml pipette was insetted, and water was twice removed to rinse the pipette. Then four successive 50 ml samples of water were withdrawn, and the radon-containing water was delivered into each of the E-PERM containing jars through the quarter-inch hole. Upon the removal of the pipette tip from each jar, the hole was immediately sealed with its stopper and caulk. Finally, four liquid scintillation samples were then withdrawn from the sample jar using a 10 ml pipette.

The six liquid scintillation samples were then counted using a LKB Model-1219 liquid scintillation counter. The E-PERM monitors remained in their jars for about 30 hours. Then they were removed, and the final voltage on each electret was determined.

The volume of the jars containing the E-PERM monitors was found to be 1960 cc, and the volume of air displaced by the walls of the E-PERM was measured to be 120 cc. Thus, after the addition of 50 cc of water, the air volume was calculated to be 1790 cc. Assuming that the air space within the jar was saturated with water vapor at the 68° F. room temperature, the volume of this water which was lost through evaporation was computed to be only 0.03 cc. Thus, the assumption made in writing equation (2) is confirmed.

Results and Discussion

Table 2 gives the results obtained from the six liquid scintillation samples and the four E-PERM measurements. All results have been corrected for decay to the time of sample collection.

TABLE 2

Comparison of Liquid Scintillation and E-PERM Dissolved Radon-222 in Water Results in (pCi/l)

| Sample Number | Liquid Scintillation | | E-PERM |
|---|---|---|---|
| | Tap Water Samples | Jar Water Samples | Jar Water Samples |
| 1 | 1636 | 1657 | 1683 |
| 2 | 1592 | 1624 | 1632 |
| 3 | | 1575 | 1465 |
| 4 | | 1629 | 1575 |
| Average ± 1σ | 1614 ± 31 | 1621 ± 38 | 1589 ± 94 |

From the liquid scintillation sample results given in Table 2, it can be seen that there was no significant loss of radon-222 from the water between the time that the tap water sample was collected to the time the last liquid scintillation sample was taken at the LLRML. The percent standard errors for these two data sets were 1.9% for the tap water sample and 2.3% for the jar water sample. The percent standard error based just on counting statistics was about 0.8%. Thus, the remaining error from other sources of 1.7% and 2.2% is representative of errors from other sources, but is primarily due to errors in measuring the sample volumes.

Within statistical fluctuations the E-PERM results agree well with both sets of liquid scintillation results. For this data set the percent standard error is about 5.9%. This uncertainty is excellent when one considers that, the standard errors associated with the electret ion chamber system is ±7%.

Sensitivity Analysis

The E-PERMS can measure air radon concentration of 10 pCi/l in one day with an error of less than 10%. If we target this as an acceptable error, we can estimate the radon concentration in water that can be measured with the same accuracy. Equation (12) is used for making such an estimate.

Taking into account the decay of radon during an extended period of measurement, it can be shown that, to obtain the same precision, the radon concentration has to be 5.95 pCi/l for a two-day measurement, 4.3 pCi/l for three-day measurement and 2.523 pCi/l for a seven-day measurement.

Example: Let the water sample be received three days after the time of collection and, if we make a one-day measurement, then the radon concentration that can be estimated with 10% error is 680, 333 and 159 pCi/l, respectively, depending upon the volume of the water (50, 100 and 200 ml, respectively) taken into the sampling chamber. Going in for a two-day measurement, the respective values are 442, 216, 103 pCi/l and so on.

Therefore, we can choose the parameters depending upon the concentration levels and the accuracy targeted.

A less-sensitive electret (a factor of 10) is available for making measurements when radon concentration in water is very high (in excess of 10,000 pCi/l).

Figure 7:
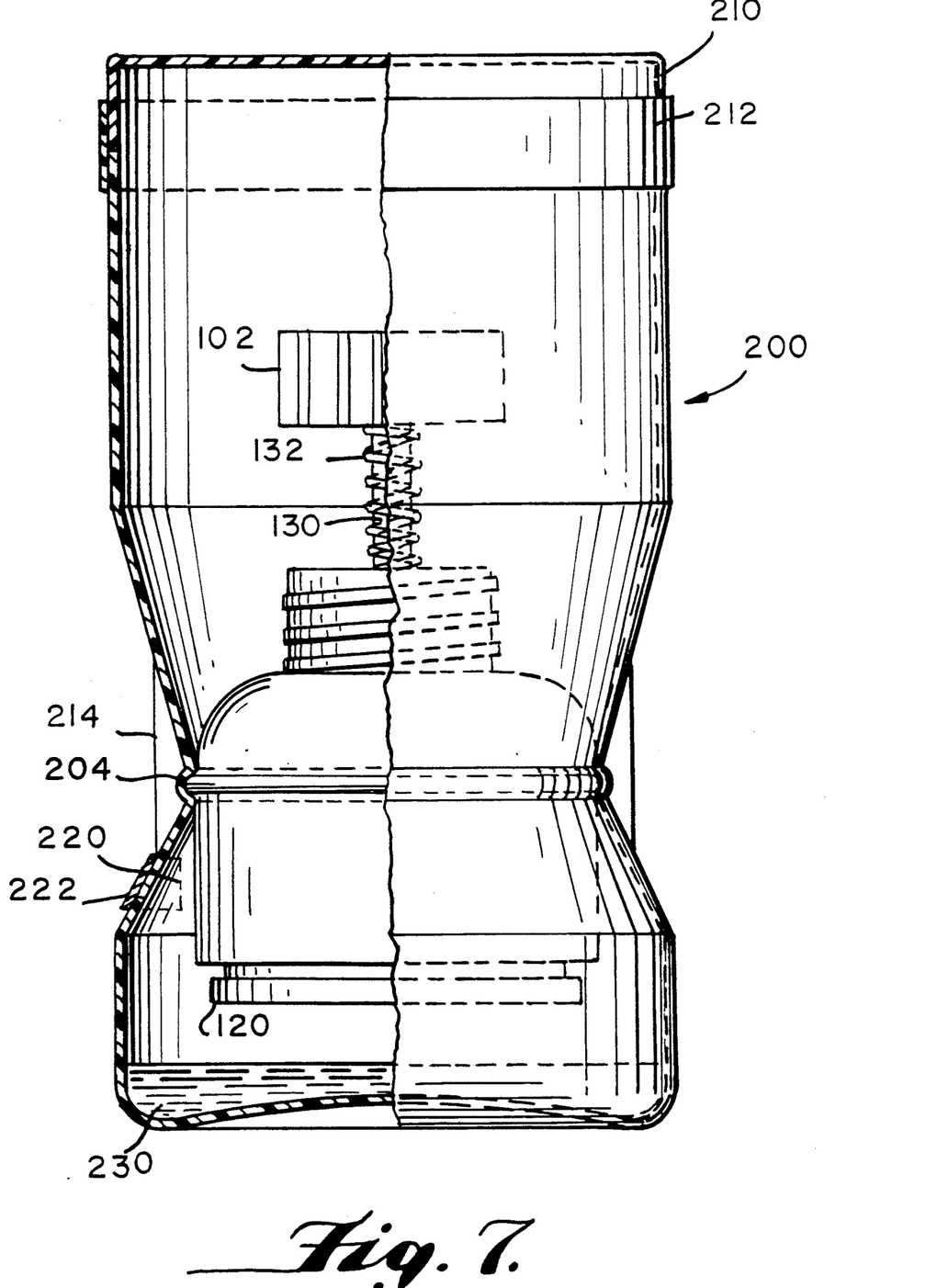
FIG. 7 is a front partially cut away view of the radon in water monitor of the present invention.

In practice the radon in water measurements can be carried out in the apparatus shown in FIG. 7. A container 200 is shown in a partially cut away view. Container 200 needs to be radon tight, that is prevent the escape of radon gas. The container may be translucent as shown in the drawing. It is preferred that the container be about 2 liter in volume. The container is designed to accept the electret ion chamber of FIGS. 5 and 6 in a groove 202 in a middle portion of the container. For rigid support, hollow ridge 204 is made on the container to strengthen the side walls and also to let the radon freely diffuse from the bottom of the container to the top.

The electret ion chamber is inserted into container 200 through lid 210 which is shown mated to the container under an adhesive tape 212. Other means for sealing the container such as a sealing compound or caulk may be used. Alternatively, the cover could be threaded on and have a gasket to form a radon tight seal. Opening and closing of the cap 102 of the electret ion chamber is performed by removing lid 210.

A water sample to be measured is entered through an opening 220 in the lower portion of the container 200. The opening can be sealed by an adhesive tape 222 or other sealing means. Alternatively the water sample can be placed in the container 200 through the lid 210 before inserting the electret ion chamber 100. The water sample 230 is preferably in the range of 50 to 100 ml.

To perform a measurement an electret ion chamber 100 is placed in the container 200 in its open or "on" position. A grab sample of water to be tested is added to the container, which is quickly sealed. Any radon gas diffuses out of the water 230 until equilibrium conditions are established between the air and water phases. The airborne radon gas also enters the chamber and, as it decays, discharges the electret voltage. After one to three days of exposure, the container is opened and the electret ion chamber is turned to its "off" position by closing the cap 102 to lower plunger 130. Subsequently, the electret is removed and its voltage measured. The voltage drop between the initial and final conditions is then used to calculate the radon concentration in the air, and this is used to calculate the initial water radon concentration.

This work has demonstrated that electret ion chamber radon detectors can be used to perform accurate dissolved radon concentrations determinations with acceptable precision. It is possible to extend the use of electret ion chamber to detect dissolved radium 226 and to radium 228.

To measure radium 226 in water the dissolved radon 222 must be removed. To remove radon 222 from the water sample it can be aerated through a sintered glass disk using aged air from a compressed air cylinder. The aerated sample can then be placed in the container 200 having an electret ion chamber 100. The radium 226 present in the water starts breeding Rn 222 and that Rn 222 partitions between the air and water in the container depending on the partition coefficient (Ostwald Coefficient). The electret ion chamber measures the integrated radon concentration in the air space from the time of sealing the enclosure to the time of opening the enclosure to measure the electret voltage reduction.

Using the following notations:
VA-Volume of air space in liters;
VW-Volume of water in liters;
L-Ostwald coefficient;
$\lambda$-Decay constant of Rn-222 in per day;
T-The duration in days over which E-PERM measurement is made;
RAe-The (integrated) equilibrium concentration of Rn-222 in air space;
RWe-The (integrated) equilibrium concentration of Rn-222 in water;
ARAe-The average concentration of Rn-222 as measured by E-PERM over the period of T days;
AO-The activity of Ra-226 in VW liters of water;
A1(t)-The activity of Rn-222 in water at any time t;
RaC-The Ra-226 concentration in water in pCi/l;

The equation for radium in water can be determined.

Radon growth equation before partitioning is $$A1(t) = AO(1 - \exp(-\lambda t))$$

Total Rn-222 activity built up in water up to the time T before partitioning is $$= AO(T + (1 - \exp(-\lambda T))/\lambda)$$

This radon partitions between the air space and water leading to $$RWe = L \times (RAe)$$

Radioactivity balance equation leads to $$\begin{aligned} AO(T + (1 - \exp(-\lambda T))/\lambda) &= RAe \times VA + RWe \times VW \\ &= (RAe)(VA + L \times VW) \\ &= (ARAe)(T)(VA + L \times VW) \end{aligned}$$

Ra-226 concentration in water = AO/VW $$RaC = \frac{(ARAe)(T)((VA/VW) - L)}{(T + (1 - \exp(-\lambda T))/\lambda)}$$

For example if:

VA = 1 liter; VW = 1 liter; T = 10 days; ARAe = 1 PCi/1;

RaC in pCi/1 = (1)(10)(1.26)14.62 = 0.862

The sensitivity parameter defined as the average radon concentration in air per pCi/1 of Ra-226 in water as per the example is

= 1.2

The concentration of 1.2 pCi/1 is measured with good accuracy (<10%) over a 10 day period.

Therefore Ra-226 concentration of about 1 pCi/1 can be measured with a good accuracy. The sensitivity parameter can be increased by decreasing VA, or increasing VW, or increasing T.

Current EPA limit for Ra-226 for drinking water is 5 pCi/1. We can standardize a procedure that enables a determination 1 pCi/1 with an acceptable accuracy (<10% error).

What has been described is an inexpensive, reusable radon in water monitor that provides reasonably accurate measurement of low concentration of dissolved radium-226 and radioactive gases in water.

Measurement of dissolved tritium, thoron, radon-228, radon-226 or carbon-14 dioxide using methods and apparatus described above is also contemplated as within the scope of this invention using parameters applicable to those gases.

What is claimed:

1. A method of monitoring radium or radioactive gases dissolved in a liquid, said method comprising using an ion chamber having electrically conductive surfaces such that an enclosed electric field attracts charged ions formed in the ion chamber by decay radiations of the radioactive gas within the chamber to a surface of a positively or negatively charged electret mounted within the chamber and neutralizing the electret such that the electret surface charge changes in proportion to the number of radioactive decays occurring within the ion chamber, a radioactive gas tight container holding a sample of the liquid to be tested, placing the electret containing chamber within the radioactive gas tight container, the radioactive gas dissolved in the liquid partitioning with the gas in the container, the electret ion chamber measuring the concentration of radioactive gas within the gas volume of the container, calculating from the known volumes of the sample and the container and the gas partitioning ratio for the length of time of exposure the starting concentration of radium or dissolved radioactive gas in the liquid sample.

2. The method of claim 1 wherein the radioactive gas is radon-222 and the liquid is water.

3. The method of claim 1 wherein the radium isotope monitored is radium-226 and the liquid is water.

4. The method of claim 1 wherein the radium isotope monitored is radium-228 and the liquid is water.

5. The method of claim 1 wherein the radioactive gas is tritium and the liquid is water.

6. The method of claim 1 wherein the radioactive gas is carbon-14 dioxide.

7. The method of claim 1 wherein the volume of the liquid sample is in the range of 40-200 ml. and the volume of the container is in the range of 1-2 liters.

8. A method of monitoring radium or radioactive gases in a liquid, said method comprising using an electret ion chamber, placing said electret ion chamber in a radioactive gas tight container having a known volume, placing a known volume of liquid to be tested into said radioactive gas tight container, exposing the electret to the gas in the container for a selected period of time, calculating the starting concentration of radium or radioactive gas in the water sample based on the known volumes, time and Ostwald partitioning of the radioactive gas in a liquid.

9. The method of claim 8 wherein the radioactive gas is radon-222 and the liquid is water.

10. The method of claim 8 wherein the radium isotope monitored is radium-226 and the liquid is water.

11. The method of claim 8 wherein the radium isotope monitored is radium-228 and the liquid is water.

12. The method of claim 8 wherein the radioactive gas is tritium and the liquid is water.

13. The method of claim 8 wherein the radioactive gas is carbon-14 dioxide.

14. The method of claim 8 wherein the volume of the liquid sample is in the range of 40-200 ml and the in the range 1-2 liters.

15. A method of measuring radioactive gases in a liquid comprising measuring the initial surface voltage of an electret, loading said electret into an ion chamber, placing the ion chamber into a radioactive gas tight container, introducing a sample of liquid to be tested into the container, exposing the electret for a known time interval, measuring the final surface voltage on the electret, calculating the starting radioactive gas concentration in the liquid sample.

16. The method of claim 15 wherein the radioactive gas is radon-222 and the liquid is water.

17. The method of claim 15 wherein the radioactive gas is tritium and the liquid is water.

18. The method of claim 15 wherein the radioactive gas is carbon-14 dioxide.

19. A method of measuring an isotope of radium in a liquid comprising measuring the initial surface voltage of an electret, loading said electret into an ion chamber, placing the ion chamber into a radioactive gas tight container, aerating a sample of liquid to be tested to remove dissolved radioactive gases, introducing the sample of liquid to be tested into the container, exposing the electret for a known time interval, measuring the final surface voltage on the electret, calculating the starting radioactive gas concentration in the liquid sample.

20. The method of claim 19 wherein the radium isotope monitored is radium-226 and the liquid is water.

21. The method of claim 19 wherein the radium isotope monitor is radium-228 and the liquid is water.

22. An apparatus for measuring radium or radioactive gases in a liquid comprising an ion chamber having an inner conductive surface, an opening in the ion chamber for allowing gases to enter the chamber, a filter for excluding particles and radon progency, an electret positioned within the chamber comprises means for holding an electrostatic charge which collects the charged substances formed in the container by radiation from the decaying radioactive products, a removable means connected to the chamber for mounting the electret, a radioactive gas tight canister having a sealable cover of a known volume for holding a sample to be tested, the container enclosing the ion chamber.

23. The apparatus of claim 22 wherein the ion chamber includes a means for reducing the gas volume exposed to the electret when the chamber is not in use.

24. An apparatus for measuring radon concentration in water comprising a radon tight container of a known volume having a sealable opening positioned to receive a sample of water to be tested and an electret ion chamber, said electret ion chamber enclosed in the container, the electret having a measurable voltage value.

* * * * *